May 14, 1929. G. EZBELENT ET AL 1,713,040
PLAITING MACHINE
Filed June 28, 1926  2 Sheets-Sheet 2
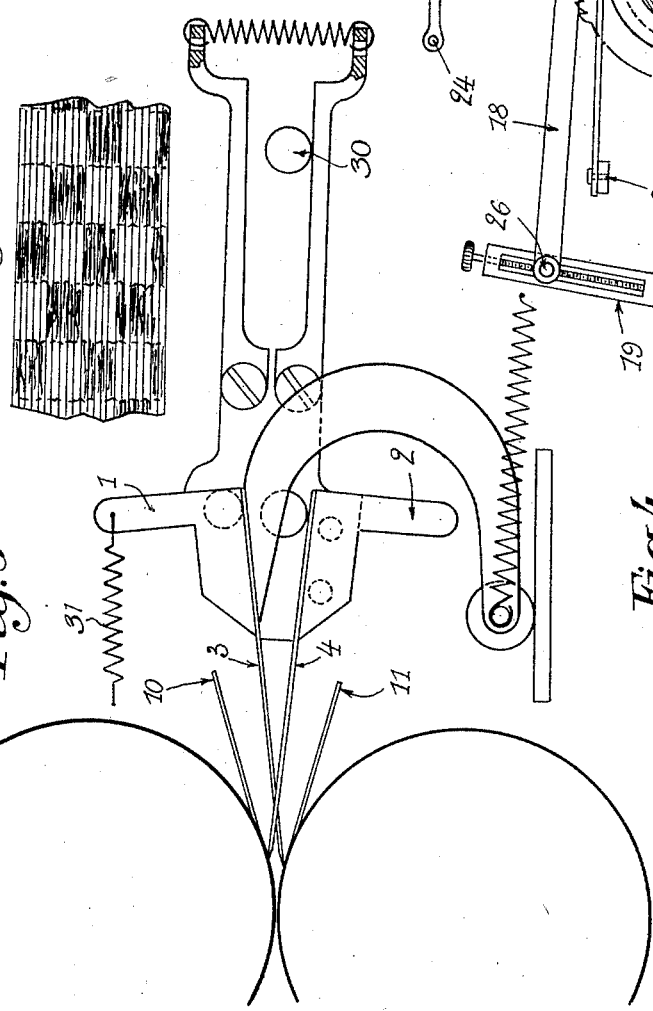
Georges Ezbelent.
and Roger Ezbelent.
Inventors
By: Marks & Clerk
Attys Patented May 14, 1929.

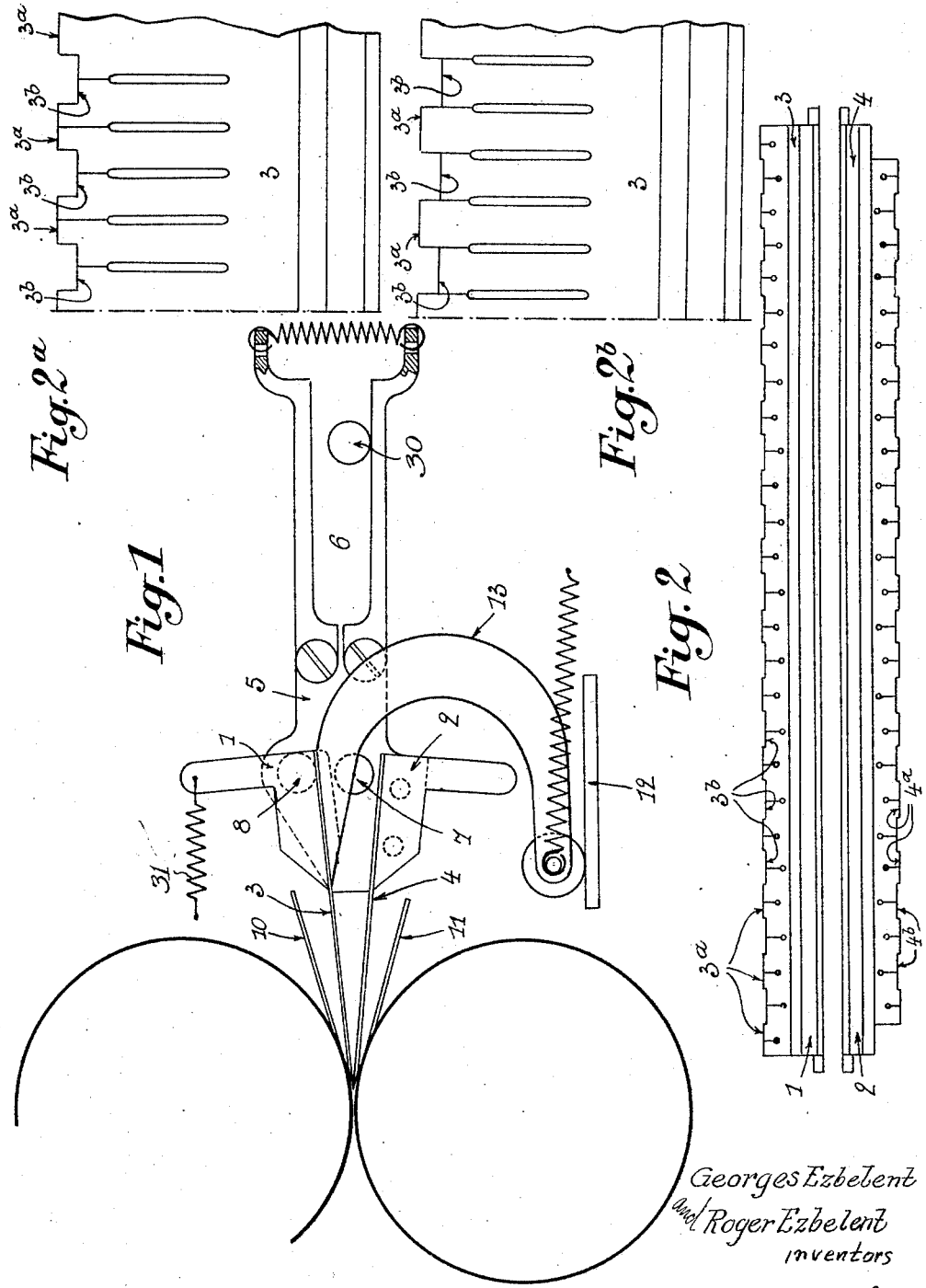

1,713,040

UNITED STATES PATENT OFFICE.

GEORGES EZBELENT AND ROGER EZBELENT, OF PARIS, FRANCE.

PLAITING MACHINE.

Application filed June 28, 1926, Serial No. 119,209, and in France September 25, 1925.

The present invention relates to plaiting machines of the type comprising two continuous and rigid knives which are pivoted at the ends.

According to the invention, the teeth of each knife have unequal lengths, the two knives being so disposed that a long tooth on one knife corresponds to a short tooth on the other knife. This arrangement, which is particularly simple, allows of obtaining plaits which are reversed one or several times in the direction of their length, although the knives employed for this purpose are continuous and rigid, and are not divided lengthwise into separate pivoted sections.

The invention further relates to a device for the lengthwise motion of the knives, thus affording varied patterns, for instance straight plaits comprising alternately reversed parts, checker work, chevrons, diamond-shapes, square shapes or like patterns, box plaits, and the like.

In the appended drawings which show by way of example a practical embodiment of the invention:

Fig. 1 is a section of the plaiting machine, with the knives in the forward position.

Fig. 2 is a plan view of the knives in their whole length, both knives being assumed contained in the plane of the sheet.

Fig. 2ª is a plan view on a larger scale of a portion of a knife, and

Fig. 2ᵇ is a like view showing a modification.

Fig. 3 is a view analogous to Fig. 1, with the knives in contact with the formation plates.

Figs. 4, 5 and 6 show portions of plaited fabric produced by a plaiting machine according to the invention.

Figs. 7 and 8 are respectively an end view and a plan view of the mechanism controlling the lengthwise motion of the knives.

The plaiting device herein represented consists, as in the known machines of two right-angled knife carriers 1 and 2 extending longitudinally in front of the rollers of the machine, each carrying a continuous knife 3, 4 whose teeth have unequal lengths, each long tooth 3ª 4ª of one knife corresponding to a short tooth 4ᵇ or 3ᵇ of the other knife.

The said teeth may be formed as shown on a larger scale in Figs. 2ª or 2ᵇ, with equal facility.

The whole formed by the two knives 1 and 2 is given a reciprocating motion to the front and rear by known means in current use upon machines of this type and which do not form part of this invention. The machine is further provided with the two usual "formation" plates i. e. the upper formation plate 10 and the lower formation plate 11. To the ends of the lower knife carrier 2 are secured the two side plates 5, one of which carries an apparatus 6, known per se, which serves to rotate the piece 2 about the shaft 7 by means of a reciprocating member 30, so that during the forward stroke, the lower knife 4 will be constantly urged to the top and will follow the upper formation plate 10.

The upper knife carrier 1 is rotatable on trunnions 8 mounted upon the plates 5 so as to follow by means of springs 31 the lower formation plate, and its opening movement is controlled by the device known per se comprising the C-shaped arm 13 secured to said knife carrier and resting through the medium of a roller upon the plate 12 which is raised by a set of cams and levers at the proper time and for a suitable period.

The two knife carriers mounted on the plates 5 are movable with said plates endwise before the rollers of the machine by a device acting on the shaft 7 and comprising a cam 15, with a groove 16, which is mounted loose on the end of one of the said rollers, and carries the ratchet wheel 17; said cam is rotated by the link and crank gear 18, 19, 20, 21, the links 18 and 19 being pivoted together by means of an adjustable slide 26 serving to regulate the amount of motion of the link 18 which actuates the pawl 17ª coacting with the ratchet wheel 17, thus regulating the angle through which the cam is turned at each rotation of the crank 21. A roller 22, engaged in the groove 16, is mounted on an arm 23 pivoted to a fixed point 24 and connected with the shaft 7 of the lower knife carrier 2 by any suitable transmission gear 25 known per se.

It will be observed that the long teeth of the upper knife coact with the lower roller, thus forming underlapping plaits, whilst the short teeth of said knife will produce no plait; the long teeth of the lower knife coact with the upper roller, thus forming overlapping plaits, whilst the short teeth of said lower knife will produce no plait. Thus each underlapping plait is situated between two overlapping plaits.

By rotating the cam 15 to obtain the progressive lengthwise motion of the set of knives before the rollers according as the plaits are produced, overlapping plaits and underlapping plaits disposed in an inclined line are obtained, and by causing the device to return to its original position in like manner, the chevron pattern which is shown in Fig. 4 is produced. By abrupt longitudinal displacements of the knives the checker work shown in Fig. 5 is obtained, and from the combination of these two above movements results the diamond shaped pattern, Fig. 6.

In the aforesaid machine, both knives are operated at the same time, but it is obvious that the invention is also applicable to machines in which the knives are successively operated and in such case, the upper knife produces the underlapping plaits, and the lower knife the overlapping plaits which are interposed between the underlapping plaits throughout the length of the plaited work.

Obviously, the invention is not limited to the constructions hereinbefore described and represented, which are given solely by way of example.

Having now described our invention, what we claim as new and desire to secure by Letters Patent is:

1. In a plaiting machine, in combination with the rollers of the machine, an upper continuous knife and a lower continuous knife, each knife having adjacent teeth alternately long and short, each long tooth of one knife being arranged to lie opposite to a short tooth of the other knife, two knife-carriers supporting said knives and adapted to be given a reciprocating movement towards and away from the rollers, means for crossing the teeth of the knives during their stroke towards the rollers in such manner that a long tooth of one knife meshes with a short tooth of the other knife and means for opening the knives during their stroke away from the rollers.

2. In a plaiting machine, in combination with the rollers of the machine, an upper continuous knife and a lower continuous knife, each knife having adjacent teeth alternately long and short, each long tooth of one knife being arranged to lie opposite a short tooth of the other knife, two knife-carriers supporting said knives and adapted to be given a reciprocating movement towards and away from the rollers, means independent from the reciprocating movement of the knife-carriers for crossing the teeth of the knives during their stroke towards the rollers in such manner that a long tooth of one knife meshes with a short tooth of the other knife, and means independent from the reciprocating movement of the knife-carriers for opening the knives during their stroke away from the rollers.

3. In a plaiting machine, in combination with the rollers of the machine, an upper continuous knife and a lower continuous knife, each knife having adjacent teeth alternately long and short, each long tooth of one knife being arranged to lie opposite a short tooth of the other knife, two knife-carriers supporting said knives, two side plates at the ends of one knife-carrier, rotatable trunnions carrying said side plates and adapted to be given a reciprocating movement towards and away from the rollers, means adapted to swing about said trunnions said knife-carrier with its knife, axles rotatably mounted in said side plates and carrying the other knife, yielding means adapted to swing this latter knife towards the first knife, an arm secured to the second knife and guiding means for said arm adapted to remove said second knife away from the first knife against the action of said yielding means.

4. In a plaiting machine, in combination with the rollers of the machine, an upper knife and a lower knife, two knife-carriers carrying said knives and adapted to be given a reciprocating movement towards and away from the rollers and also an endwise movement perpendicular to said reciprocating movement and means for imparting said endwise movement to both knife-carriers together.

5. In a plaiting machine, in combination with the rollers of the machine, two knives adapted to be given a reciprocating movement towards and away from the rollers and also an endwise movement perpendicular to said reciprocating movement, the working edges of said knives being formed of teeth adapted to cross between the rollers and means for imparting said endwise movement to said knives.

In testimony whereof we have signed our names to this specification.

GEORGES EZBELENT.
ROGER EZBELENT.